US010068081B2

(12) United States Patent
Yoshimura

(10) Patent No.: US 10,068,081 B2
(45) Date of Patent: Sep. 4, 2018

(54) INFORMATION PROCESSING SYSTEM, INFORMATION PROCESSING APPARATUS, AND NON-TRANSITORY COMPUTER READABLE MEDIUM

(71) Applicant: FUJI XEROX CO., LTD., Tokyo (JP)

(72) Inventor: Tomokazu Yoshimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 172 days.

(21) Appl. No.: 15/044,339

(22) Filed: Feb. 16, 2016

(65) Prior Publication Data

US 2017/0004299 A1    Jan. 5, 2017

(30) Foreign Application Priority Data

Jul. 3, 2015    (JP) .................................. 2015-134261

(51) Int. Cl.
| H04L 29/06 | (2006.01) |
| G06F 21/33 | (2013.01) |
| G06F 21/45 | (2013.01) |
| G06F 21/60 | (2013.01) |

(52) U.S. Cl.
CPC .............. G06F 21/33 (2013.01); G06F 21/45 (2013.01); G06F 21/608 (2013.01); H04L 63/0823 (2013.01)

(58) Field of Classification Search
CPC ........ G06F 21/33; G06F 21/608; G06F 21/45; H04L 63/0823
See application file for complete search history.

(56) References Cited

U.S. PATENT DOCUMENTS

| 2002/0054341 | A1* | 5/2002 | Suzuki | H04N 1/00912 358/1.15 |
| 2005/0097314 | A1* | 5/2005 | Matsushima | G06F 21/33 713/156 |
| 2005/0160476 | A1* | 7/2005 | Kakii | H04L 9/3263 726/5 |
| 2005/0188196 | A1* | 8/2005 | Kakii | H04L 9/3263 713/156 |

(Continued)

FOREIGN PATENT DOCUMENTS

| JP | 2010-072760 A | 4/2010 |
| JP | 2010-204722 A | 9/2010 |

*Primary Examiner* — David García Cervetti
(74) *Attorney, Agent, or Firm* — Oliff PLC

(57) ABSTRACT

An information processing system includes a terminal apparatus including an instruction information creation unit and a first transmission unit, and an information processing apparatus including an execution unit, a reception unit, and a controller. The instruction information creation unit accepts one or more settings relating to processing and creates instruction information denoting the one or more settings. The first transmission unit transmits the instruction information to the information processing apparatus. The execution unit performs the processing related to the one or more settings denoted by the instruction information. The reception unit receives the instruction information and certificate information. The certificate information is information that certifies content of a first prohibition check process in which whether the execution unit supports the one or more settings is determined. The controller performs control so that the processing is performed depending on validity of the certificate information.

14 Claims, 4 Drawing Sheets

(56) References Cited

U.S. PATENT DOCUMENTS

| | | | |
|---|---|---|---|
| 2005/0204164 A1* | 9/2005 | Kakii | H04L 9/3268 726/5 |
| 2005/0225793 A1* | 10/2005 | Namikata | H04N 1/00843 358/1.14 |
| 2005/0287998 A1* | 12/2005 | Tonouchi | H04L 12/1813 455/416 |
| 2006/0168443 A1* | 7/2006 | Miller | H04L 63/0823 713/156 |
| 2006/0182042 A1* | 8/2006 | Nasu | H04L 41/28 370/254 |
| 2007/0005737 A1* | 1/2007 | Maki | H04L 61/2015 709/222 |
| 2007/0055865 A1* | 3/2007 | Kakii | H04L 9/3263 713/156 |
| 2007/0150727 A1* | 6/2007 | Miyazawa | G06F 21/604 713/158 |
| 2007/0182986 A1* | 8/2007 | Ciriza | G06F 21/608 358/1.15 |
| 2008/0307416 A1* | 12/2008 | Inoue | H04L 41/0803 718/100 |
| 2009/0073487 A1* | 3/2009 | Li | H04N 1/0097 358/1.15 |
| 2009/0216785 A1* | 8/2009 | Sato | G06F 21/606 |
| 2009/0222546 A1* | 9/2009 | Hatano | H04L 41/0213 709/223 |
| 2010/0180345 A1* | 7/2010 | Manchala | G06F 21/10 726/26 |
| 2010/0235642 A1* | 9/2010 | Ota | H04L 63/0428 713/175 |
| 2010/0250923 A1* | 9/2010 | Yanagi | H04L 9/3263 713/162 |
| 2011/0162085 A1* | 6/2011 | Nagasaki | G06F 21/64 726/28 |
| 2012/0066490 A1* | 3/2012 | Sato | G06F 21/72 713/153 |
| 2012/0222101 A1* | 8/2012 | Iwasaki | H04L 63/0823 726/7 |
| 2012/0307303 A1* | 12/2012 | Harada | G06K 15/005 358/1.15 |
| 2013/0061041 A1* | 3/2013 | Inoue | G06F 21/44 713/156 |
| 2013/0094063 A1* | 4/2013 | Takagi | G06K 15/02 358/3.28 |
| 2014/0071484 A1* | 3/2014 | Ishii | G06F 21/608 358/1.15 |
| 2015/0363173 A1* | 12/2015 | Kurokawa | G06F 8/31 717/115 |
| 2016/0359849 A1* | 12/2016 | Nakajima | H04L 63/0853 |

* cited by examiner

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-134261 filed Jul. 3, 2015.

BACKGROUND (i) Technical Field

The present invention relates to an information processing system, an information processing apparatus, and a non-transitory computer readable medium.

(ii) Related Art

Typical image forming apparatuses having a function, such as a print function or a copy function, include an execution unit (device layer) that performs processing, such as image formation, and a user interface (UI) unit (presentation layer), such as an operation panel or a terminal apparatus that accepts settings relating to the processing. Typically, the device layer and the presentation layer are connected to each other in accordance with a specific rule. For example, the presentation layer and the device layer are designed so that the presentation layer does not accept settings relating to processing not supported by the device layer in some cases.

The device layer and the presentation layer are connected to each other via a general-purpose interface based on Hypertext Transfer Protocol (HTTP) or the like in some cases.

SUMMARY

According to an aspect of the invention, there is provided an information processing system including a terminal apparatus and an information processing apparatus. The terminal apparatus includes an instruction information creation unit and a first transmission unit. The instruction information creation unit accepts one or more settings relating to processing and creates instruction information denoting the one or more settings. The first transmission unit transmits the instruction information to the information processing apparatus. The information processing apparatus includes an execution unit, a reception unit, and a controller. The execution unit performs the processing related to the one or more settings denoted by the instruction information. The reception unit receives the instruction information and certificate information. The certificate information is information that certifies content of a first prohibition check process in which whether the execution unit supports the one or more settings is determined. The controller performs control so that the processing is performed depending on validity of the certificate information.

BRIEF DESCRIPTION OF THE DRAWINGS

An exemplary embodiment of the present invention will be described in detail based on the following figures, wherein.

DETAILED DESCRIPTION

Figure 1:
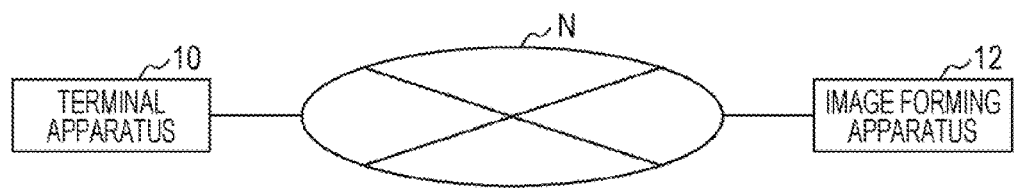
FIG. 1 is a block diagram illustrating an image forming system according to an exemplary embodiment of the present invention.

FIG. 1 illustrates an example of an image forming system, which corresponds to an information processing system according to an exemplary embodiment of the present invention. The image forming system includes a terminal apparatus 10 and an image forming apparatus 12, which corresponds to an information processing apparatus. The terminal apparatus 10 and the image forming apparatus 12 are connected to a communication channel N, such as a network.

The terminal apparatus 10 may be an apparatus, such as a tablet personal computer (PC), a smartphone, a mobile phone, or a PC. The terminal apparatus 10 has a function of exchanging data with another apparatus. For example, the terminal apparatus 10 creates instruction information that denotes processing to be performed by the image forming apparatus 12 and transmits the instruction information to the image forming apparatus 12.

The image forming apparatus 12 has a function of exchanging data with another apparatus and at least one of a print function, a copy function, a scan function, and a fax function. The image forming apparatus 12 may also have a post-processing function. Examples of post-processing include processing a printed result with a tool such as a stapler or a hole punch. The image forming apparatus 12 performs processing in accordance with instruction information received from the terminal apparatus 10.

The terminal apparatus 10 and the image forming apparatus 12 are connected to each other, for example, via a general-purpose interface based on HTTP or the like. Accordingly, it is probable that the terminal apparatus 10 for general-purpose is connected to the image forming apparatus 12.

Configurations of the terminal apparatus 10 and the image forming apparatus 12 will be described in detail below.

Figure 2:
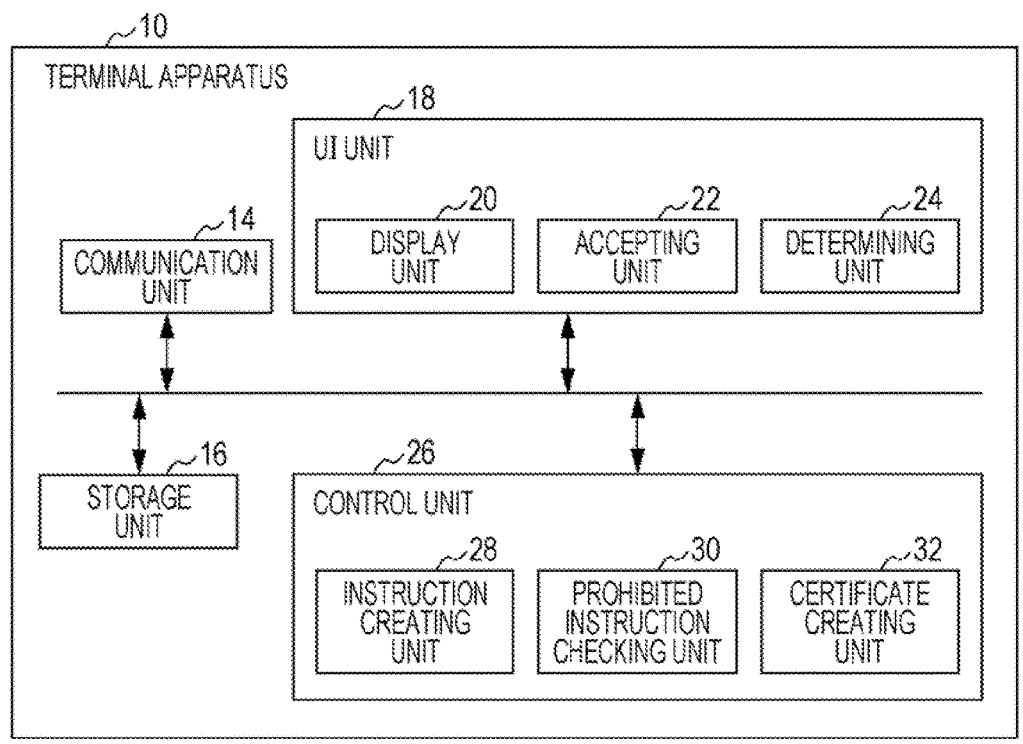
FIG. 2 is a block diagram illustrating a terminal apparatus according to the exemplary embodiment.

First, the configuration of the terminal apparatus 10 will be described below. FIG. 2 illustrates the configuration of the terminal apparatus 10.

The terminal apparatus 10 includes a communication unit 14, a storage unit 16, a user interface (UI) unit 18, and a control unit 26. The communication unit 14, which is a communication interface, has a function of transmitting data to another apparatus and a function of receiving data from another apparatus. For example, data such as instruction information is transmitted to the image forming apparatus 12 via the communication unit 14.

The storage unit 16 is a storage device, such as a hard disk drive (HDD). The storage unit 16 stores terminal-side prohibition condition information that denotes a terminal-side prohibition condition (terminal-side prohibition logic) used in a terminal-side prohibition check process (described later). The terminal-side prohibition condition information includes, for example, information denoting the name of the terminal-side prohibition condition and information denoting the version of the terminal-side prohibition condition. The terminal-side prohibition condition information may be, for example, information supplied from the image forming apparatus 12 or information supplied from an external apparatus, such as a print server or an image server.

The UI unit 18, which is a user interface, includes a display unit 20, an accepting unit 22, and a determining unit 24. The display unit 20 is, for example, a display device such as a liquid crystal display. The accepting unit 22 is, for example, an input device such as a touchscreen or a keyboard and mouse. The accepting unit 22 accepts information input by the user. For example, the display unit 20 displays a setting screen in which one or more settings are set for processing to be performed by the image forming apparatus 12. A setting relating to processing to be performed by the image forming apparatus 12 is set by a user in the setting screen, and the accepting unit 22 accepts information denoting the setting. Such a setting function is implemented by an application (program), for example. The application is transmitted from an external apparatus to the terminal apparatus 10 and is installed on the terminal apparatus 10. Alternatively, the application is pre-installed on the terminal apparatus 10.

In accordance with the terminal-side prohibition condition, the determining unit 24 performs a terminal-side prohibition check process on the setting (processing content) denoted by the information accepted by the accepting unit 22. In this way, a setting relating to processing not supported by the image forming apparatus 12 is prohibited.

The terminal-side prohibition condition defines a settings not supported by the image forming apparatus 12, that is, processing uniquely prohibited in the image forming apparatus 12. For example, post-processing options may include a post-processing combination (for example, combination of stapling and hole punching) not supported by the image forming apparatus 12. Specifically, the image forming apparatus 12 does not support stapling and hole punching at the same position and does not implement such processing. Accordingly, stapling and hole punching at the same position corresponds to the prohibited processing. In another example, the image forming apparatus 12 sometimes does not support a specific paper size or a combination of specific paper types. For example, the image forming apparatus 12 sometimes does not support stapling at a specific position on paper of a specific size. In still another example, the image forming apparatus 12 sometimes does not support a specific type of binding. The prohibited processing is not limited to processing prohibited due to hardware constraints and may be processing prohibited due to software constraints. For example, an image processing method (for example, a file encryption method) used sometimes differs depending on the data format, such as portable document format (PDF) or Xerox DocuWorks (XDW) format. An image processing method not supported by the image forming apparatus 12 corresponds to the processing prohibited due to software constraints. The terminal-side prohibition condition denotes such a prohibition condition (condition for hardware-related prohibition and software-related prohibition).

In accordance with the terminal-side prohibition condition, the determining unit 24 determines whether the image forming apparatus 12 supports the setting (processing content) denoted by the information accepted by the accepting unit 22. Every time the accepting unit 22 accepts information denoting a setting, the determining unit 24 performs a terminal-side prohibition check process on the setting. For example, a result of the terminal-side prohibition check process (determination result) is displayed on the display unit 20 under control of the control unit 26 (described below). Specifically, a part corresponding to processing that meets the terminal-side prohibition condition may be masked in the setting screen displayed on the display unit 20 to make the processing not selectable by the user. In another example, selection of the processing that meets the terminal-side prohibition condition may be prohibited. In still another example, information indicating that the image forming apparatus 12 does not support the selected processing may be displayed in a display manner, such as pop-up display. For example, suppose that the image forming apparatus 12 does not support a combination of processing A and processing B. The processing A is stapling at a certain position, and the processing B is hole punching at the same position. In the case where the processing A is set by the user, a setting item for the processing B may be masked in the setting screen so that the processing B is not selected by the user, selection of the processing B may be prohibited (acceptance of selection may be prohibited), or information indicating that the image forming apparatus 12 does not support the combination of the processing A and the processing B may be displayed. In this way, the prohibition check process is performed when the user sets a setting.

The control unit 26 controls operations of the individual units of the terminal apparatus 10. The control unit 26 includes an instruction creating unit 28, a prohibited instruction checking unit 30, and a certificate creating unit 32.

The instruction creating unit 28 creates instruction information on the basis of the information accepted by the accepting unit 22 (settings set by the user in relation to processing). The instruction information denotes a series of steps (commands) of processing to be performed by the image forming apparatus 12. The instruction information is information written in an Extensible Markup Language (XML) format, for example. The instruction information may be edited by the user using the image forming apparatus 12. Examples of the processing include copying, scanning, printing, post-processing, and data transferring. Instruction information includes instruction information identification (ID) for identifying the instruction information and terminal identification information for identifying the terminal apparatus 10 that has created the instruction information. Instruction information may further include information denoting data to be processed.

In accordance with the terminal-side prohibition condition, the prohibited instruction checking unit 30 performs a terminal-side prohibition check process on settings (processing content) denoted by the instruction information created by the instruction creating unit 28. Through this process, it is determined whether the image forming apparatus 12 supports individual settings. For example, a result of the terminal-side prohibition check process (determination result) is displayed on the display unit 20 under control of the control unit 26. Specifically, if the instruction information denotes processing that meets the terminal-side prohibition condition, the control unit 26 causes an error message or a message prompting the user to change the setting to be displayed in the setting screen displayed on the display unit 20. If the instruction information denotes no processing that meets the terminal-side prohibition condition, the certificate creating unit 32 (described later) creates certificate information.

The determining unit 24 performs a prohibition check process on a setting every time the accepting unit 22 accepts information denoting the setting. In contrast, the prohibited instruction checking unit 30 performs a prohibition check process on instruction information created based on confirmed settings. That is, every time a setting relating to processing is set by the user, the determining unit 24 performs a prohibition check process for the processing. In contrast, the prohibited instruction checking unit 30 performs a prohibition check process collectively for a processing group for which settings have been set and confirmed by the user. The prohibition check process may be performed only by the determining unit 24, only by the prohibited instruction checking unit 30, or by both the determining unit 24 and the prohibited instruction checking unit 30.

The certificate creating unit 32 creates certificate information that certifies content of the terminal-side prohibition check process. The certificate information is information indicating that the prohibition check process has been performed on the corresponding instruction information in the terminal apparatus 10. That is, in the case where the prohibition check process is performed on the corresponding instruction information by at least one of the determining unit 24 and the prohibited instruction checking unit 30, certificate information is created for the instruction information. Certificate information includes certificate information ID for identifying the certificate information, time information representing date/time at which the prohibition check process has been performed, and information regarding the terminal-side prohibition condition. The information regarding the terminal-side prohibition condition may include, for example, information denoting the name of the terminal-side prohibition condition and information denoting the version of the terminal-side prohibition condition. Certificate information may include the terminal-side prohibition condition information. For example, in the case where instruction information denotes no processing that meets the terminal-side prohibition condition, the certificate creating unit 32 creates certificate information. In this case, the certificate information indicates that the instruction information does not denote processing that meets the terminal-side prohibition condition.

The instruction information and the certificate information are transmitted to the image forming apparatus 12 via the communication unit 14. Note that the instruction information may include the certificate information.

Figure 3:
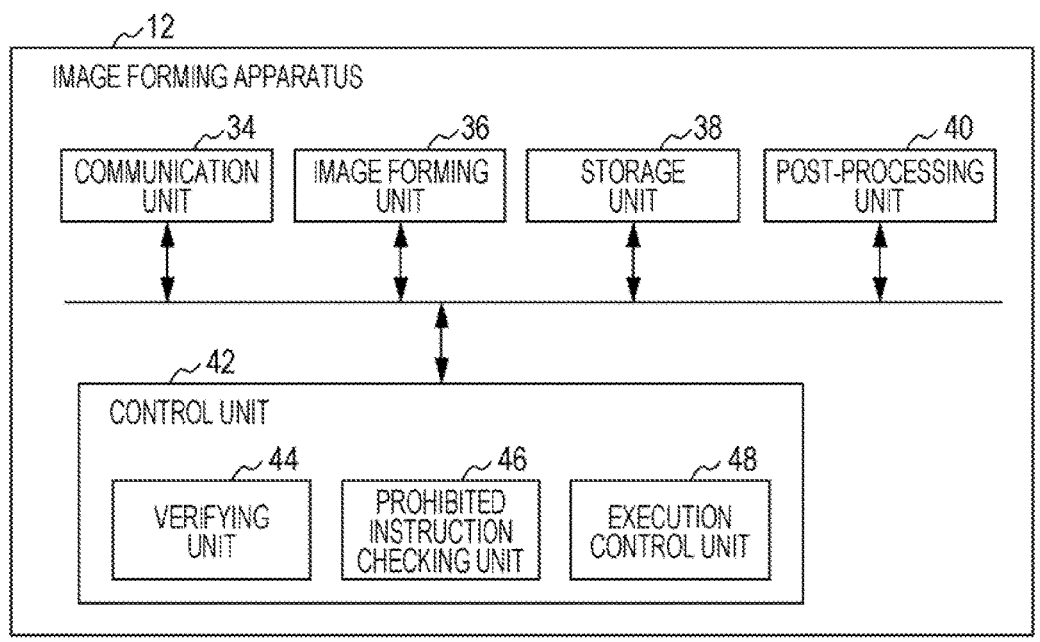
FIG. 3 is a block diagram illustrating an image forming apparatus according to the exemplary embodiment.

The configuration of the image forming apparatus 12 will be described next. FIG. 3 illustrates the configuration of the image forming apparatus 12.

The image forming apparatus 12 includes a communication unit 34, an image forming unit 36, a storage unit 38, a post-processing unit 40, and a control unit 42. The communication unit 34, which is a communication interface, has a function of transmitting data to another apparatus and a function of receiving data from another apparatus. For example, the instruction information and the certificate information transmitted from the terminal apparatus 10 are received via the communication unit 34.

The image forming unit 36 has a function of performing processing involving image formation, in accordance with the instruction information. For example, the image forming unit 36 performs processing, such as copying, scanning, or printing. In copying, an original is copied. In scanning, an original is scanned and corresponding document data, which may include image data, is generated. In printing, an image is printed on a recording medium such as paper.

The storage unit 38 is a storage device, such as an HDD. The storage unit 38 stores device-side prohibition condition information that denotes a device-side prohibition condition (device-side prohibition logic) used in a device-side prohibition check process (described later). The device-side prohibition condition information includes, for example, information denoting the name of the device-side prohibition condition and information denoting the version of the device-side prohibition condition. For example, the device-side prohibition condition information is created and stored in the storage unit 38 in advance.

The device-side prohibition condition defines settings not supported by the image forming apparatus 12, that is, processing uniquely prohibited in the image forming apparatus 12. Like the terminal-side prohibition condition, the device-side prohibition condition defines a combination of post-processing as prohibited processing, for example.

The post-processing unit 40 has a function of performing post-processing, such as folding, hole punching, or stapling, in accordance with the instruction information. For example, the post-processing unit 40 has a function of processing a printed result with a stapler or a hole punch.

The control unit 42 has a function of controlling operations of the individual units of the image forming apparatus 12. The control unit 42 includes a verifying unit 44, a prohibited instruction checking unit 46, and an execution control unit 48.

The verifying unit 44 has a function of verifying whether certificate information is valid. For example, the verifying unit 44 verifies whether certificate information is valid on the basis of information concerning the terminal-side prohibition condition included in the certificate information and information concerning the device-side prohibition condition. If the terminal-side prohibition condition corresponds to the device-side prohibition condition, the verifying unit 44 determines that the certificate information is valid. If the terminal-side prohibition condition does not correspond to the device-side prohibition condition, the verifying unit 44 determines that the certificate information is invalid. For example, the verifying unit 44 compares the name of the terminal-side prohibition condition with the name of the device-side prohibition condition. If the names match, the verifying unit 44 determines that the certificate information is valid. If the names do not match, the verifying unit 44 determines that the certificate information is invalid. In another example, the verifying unit 44 may compare the version of the terminal-side prohibition condition with the version of the device-side prohibition condition. If the versions match, the verifying unit 44 may determine that the certificate information is valid. If the versions do not match, the verifying unit 44 may determine that the certificate information is invalid. Even in the case where the versions do not exactly match, if a difference between the versions is within an allowable range, the certificate information may be determined to be valid. The verifying unit 44 may verify whether the certificate information is valid on the basis of both the names and the versions. Specifically, the verifying unit 44 may determine that the certificate information is valid if the name of the terminal-side prohibition condition matches the name of the device-side prohibition condition and the version of the terminal-side prohibition condition matches the version of the device-side prohibition condition or the difference between the versions is within the allowable range; otherwise, the verifying unit 44 may determine that the certificate information is invalid. In another example, the verifying unit 44 may verify whether the certificate information is valid on the basis of time information (information representing the date/time at which the prohibition check process has been performed) included in the certificate information. For example, if a difference between the date/time denoted by the time information (date/time at which the terminal-side prohibition check process has been performed in the terminal apparatus 10) and the date/time at which the certificate information is received by the image forming apparatus 12 is within an allowable range, the verifying unit 44 may determine that the certificate information is valid. If the difference between the date/times is not within the allowable range, the verifying unit 44 may determine that the certificate information is invalid. In addition, if no certificate information is transmitted for instruction information from the terminal apparatus 10 to the image forming apparatus 12, the verifying unit 44 determines that the certificate information (instruction information) is invalid. That is, if the image forming apparatus 12 does not receive certificate information including the instruction information ID of the instruction information, the certificate information (instruction information) is determined to be invalid.

If the certificate information is valid, processing denoted by the instruction information corresponding to the certificate information is permitted to be performed and is performed by the image forming apparatus 12. If the certificate information is invalid, the prohibited instruction checking unit 46 (described below) performs a prohibition check process on the instruction information. In addition, if the certificate information is invalid, information prompting updating of the terminal-side prohibition condition may be transmitted to the terminal apparatus 10 via the communication unit 34 under control of the control unit 42.

In accordance with the device-side prohibition condition, the prohibited instruction checking unit 46 performs a device-side prohibition check process on settings (processing content) denoted by the instruction information. Through this process, it is determined whether the image forming apparatus 12 supports the individual settings. For example, information indicating a result of the device-side prohibition check process (determination result) is transmitted to the terminal apparatus 10 via the communication unit 34 under control of the control unit 42. Consequently, the determination result is displayed on the display unit 20 of the terminal apparatus 10. For example, if the instruction information denotes processing that meets the device-side prohibition condition, an error message or a message prompting the user to change the setting is transmitted from the image forming apparatus 12 to the terminal apparatus 10 and is displayed on the display unit 20 of the terminal apparatus 10. If the instruction information denotes no processing that meets the device-side prohibition condition, the image forming apparatus 12 performs the processing denoted by the instruction information.

The execution control unit 48 has a function of controlling execution of the processing denoted by the instruction information. For example, the execution control unit 48 analyzes the instruction information to identify content of processing denoted by the instruction information and controls the individual units of the image forming apparatus 12 so that the processing is performed.

In the case where the above-described image forming system is divided into a presentation layer (P layer) and a device layer (D layer), the terminal apparatus 10 corresponds to the P layer, whereas the image forming apparatus 12 corresponds to the D layer. In the example illustrated in FIG. 1, the terminal apparatus 10 serving as the P layer and the image forming apparatus 12 serving as the D layer are physically separated. In another example, the terminal apparatus 10 and the image forming apparatus 12 may be physically integrated. That is, the terminal apparatus 10 may be included in the image forming apparatus 12 as part of the image forming apparatus 12. In this case, the terminal apparatus 10 corresponds to a UI unit, and the image forming apparatus 12 corresponds to a processing unit. Even in the case where the terminal apparatus 10 and the image forming apparatus 12 are integrated, the terminal apparatus 10 may be independent from the image forming apparatus 12. Note that the image forming apparatus 12 may be equipped with another UI unit, and instruction information may be given to the image forming apparatus 12 from the UI unit. In the case where the image forming apparatus 12 is equipped with such a UI unit, the UI unit corresponds to the P layer and units of the image forming apparatus 12 other than the UI unit, such as the image forming unit 36, correspond to the D layer.

Figure 4:
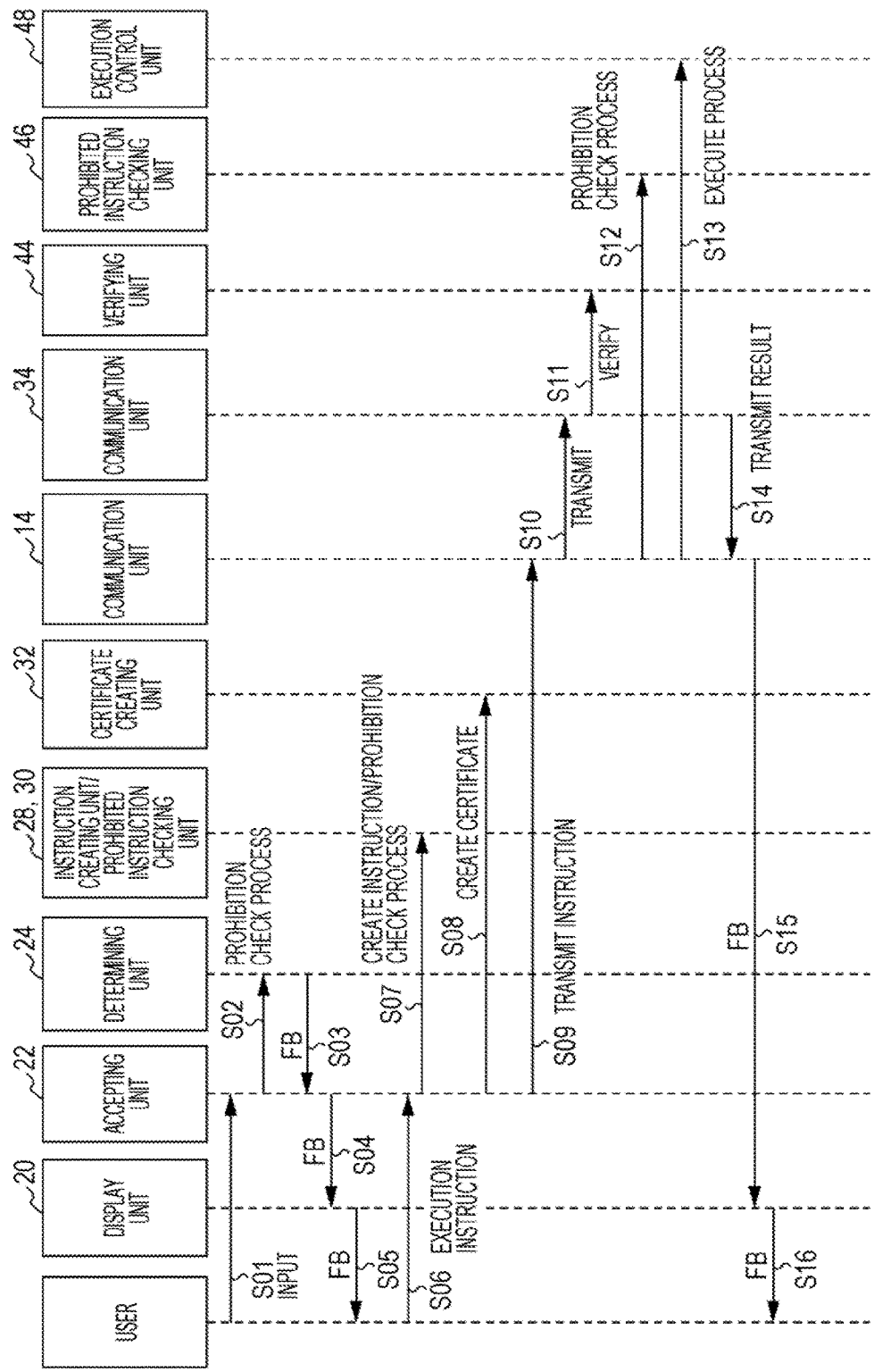
FIG. 4 is a sequence chart illustrating an example of a process according to the exemplary embodiment.

A process performed by the image forming system will be described in detail below with reference to a sequence chart illustrated in FIG. 4.

The terminal apparatus 10 accepts a user instruction. Then, a setting screen is displayed on the display unit 20. If the user sets a setting for processing in the setting screen, the accepting unit 22 accepts information (input information) denoting the setting (S01).

In the case where instruction information is created by performing a terminal-side prohibition check process on the processing content set by the user, the determining unit 24 performs a terminal-side prohibition check process on each setting in accordance with the terminal-side prohibition condition every time the accepting unit 22 accepts information denoting a setting (processing content) (S02). Through this process, it is determined whether the image forming apparatus 12 supports each setting. A result of the terminal-side prohibition check process (determination result) is displayed on the display unit 20 and is fed back to the user (S03-S05). For example, suppose that the image forming apparatus 12 does not support a combination of processing A and processing B. In such a case, if the processing A is set by the user, a setting item for the processing B may be masked, selection of the processing B is prohibited, or information indicating that the image forming apparatus 12 does not support such a combination may be displayed. The instruction creating unit 28 creates instruction information denoting processing that does not meet the terminal-side prohibition condition from among the processing group for which settings are set by the user. For example, every time the accepting unit 22 accepts information denoting a setting (processing content), the terminal-side prohibition check process is performed. The information representing the processing that does not meet the terminal-side prohibition condition is then included in the instruction information. The instruction information includes instruction information ID for identifying the instruction information and terminal identification information for identifying the terminal apparatus 10 that has created the instruction information. In the case where instruction information is created without performing a terminal-side prohibition check process on processing content set by the user, a prohibition check process is performed by the prohibited instruction checking unit 30 as described below.

After the user finishes the setting, the user inputs an instruction to perform processing (instruction to start processing) in the setting screen (S06). The accepting unit 22 accepts this instruction.

In the case where the terminal-side prohibition check process by the determining unit 24 is omitted, that is, in the case where the terminal-side prohibition check process is performed collectively on content of the confirmed processing group, the instruction creating unit 28 creates instruction information denoting the processing group (S07). The instruction information includes instruction information ID for identifying the instruction information and terminal identification information for identifying the terminal apparatus 10 that has created the instruction information. The prohibited instruction checking unit 30 then performs the terminal-side prohibition check process on the settings (processing content) denoted by the instruction information created by the instruction creating unit 28, in accordance with the terminal-side prohibition condition. Through this process, it is determined whether the image forming apparatus 12 supports the individual settings denoted by the instruction information. A result of the terminal-side prohibition check process (determination result) is displayed on the display unit 20. For example, in the case where the instruction information denotes processing that meets the terminal-side prohibition condition, an error message or a message prompting the user to change the setting is displayed on the display unit 20. Note that even in the case where the terminal-side prohibition check process is performed by the determining unit 24, the terminal-side prohibition check process may be performed by the prohibited instruction checking unit 30.

In the case where the prohibition check process is performed by at least one of the determining unit 24 and the prohibited instruction checking unit 30, the certificate creating unit 32 creates certificate information to certify the content of the terminal-side prohibition check process (S08). For example, in the case where the instruction information does not denote processing that meets the device-side prohibition condition, the certificate creating unit 32 creates the certificate information. The certificate information includes instruction information ID for identifying the corresponding instruction information, time information representing the date/time at which the prohibition check process has been performed, and information denoting the name and the version of the terminal-side prohibition condition.

A transmission instruction is then given to the communication unit 14 (S09), and the instruction information and the certificate information are transmitted to the image forming apparatus 12 via the communication unit 14 (S10).

The communication unit 34 of the image forming apparatus 12 receives the instruction information and the certificate information. Then, the verifying unit 44 verifies whether the certificate information is valid (S11). For example, the verifying unit 44 compares the name of the terminal-side prohibition condition with the name of the device-side prohibition condition. If the names match, the verifying unit 44 determines that the certificate information is valid. If the names do not match, the verifying unit 44 determines that the certificate information is invalid. Alternatively, the verifying unit 44 may compare the version of the terminal-side prohibition condition with the version of the device-side prohibition condition. If the versions match or a difference between the versions is within an allowable range, the verifying unit 44 may determine that the certificate information is valid. If the versions do not match or the difference between the versions is not within the allowable range, the verifying unit 44 may determine that the certificate information is invalid. Alternatively, the verifying unit 44 may verify whether the certificate information is valid on the basis of the date/time at which the terminal-side prohibition check process has been performed. In addition, if no certificate information corresponding to the instruction information is received by the image forming apparatus 12, the verifying unit 44 determines that the certificate information (instruction information) is invalid.

If the certificate information is invalid, the prohibited instruction checking unit 46 performs a device-side prohibition check process on the settings (processing content) denoted by the instruction information, in accordance with the device-side prohibition condition (S12). Through this process, it is determined whether the image forming apparatus 12 supports the settings denoted by the instruction information.

If the certificate information is valid or if it is determined as a result of the device-side prohibition check process that the instruction information does not denote settings not supported by the image forming apparatus 12, the execution control unit 48 controls the individual units of the image forming apparatus 12 so that the processing denoted by the instruction information is performed (S13). Consequently, the processing based on the instruction information is performed. For example, printing and post-processing are performed.

On the other hand, if it is determined as a result of the device-side prohibition check process that the instruction information denotes settings not supported by the image forming apparatus 12, execution of the processing denoted by the instruction information is prohibited.

Information indicating the processing result is then transmitted to the terminal apparatus 10 via the communication unit 34 (S14). The processing result is displayed on the display unit 20 of the terminal apparatus 10 (S15). In this way, the processing result is fed back to the user (S16).

In the case where the processing denoted by the instruction information is performed, information indicating so is transmitted to the terminal apparatus 10 and is displayed on the display unit 20.

On the other hand, in the case where execution of the processing denoted by the instruction information is prohibited as a result of the device-side prohibition check process, information indicating so is transmitted to the terminal apparatus 10 and is displayed on the display unit 20. For example, information indicating that processing not supported by the image forming apparatus 12 is denoted by the instruction information is transmitted to the terminal apparatus 10 and is displayed on the display unit 20. In this case, for example, processing according to a user's intention is performed. For example, processing is reconfigured. In this case, the user may edit the instruction information so that processing not supported by the image forming apparatus 12 is not denoted by the instruction information. Alternatively, the user may cancel the processing. Also, information prompting updating of the terminal-side prohibition condition may be transmitted from the image forming apparatus 12 to the terminal apparatus 10 and may be displayed on the display unit 20 of the terminal apparatus 10. In another example, if the version of the device-side prohibition condition is old (is older than a reference version), information prompting updating of the device-side prohibition condition may be transmitted from the image forming apparatus 12 to the terminal apparatus 10 and may be displayed on the display unit 20 of the terminal apparatus 10. That is, information prompting updating of the terminal-side prohibition condition or the device-side prohibition condition may be displayed on the display unit 20.

As described above, in accordance with the exemplary embodiment, the terminal-side prohibition check process is performed by the terminal apparatus 10, and a result of the terminal-side prohibition check process is presented to the user. Accordingly, the check result is presented to the user at a stage earlier than in the case where only the image forming apparatus 12 performs a prohibition check process.

In addition, the certificate information is created by the terminal apparatus 10 and is verified by the image forming apparatus 12. In this way, whether the prohibition check process has been performed by the terminal apparatus 10 in accordance with the terminal-side prohibition condition that corresponds to the device-side prohibition condition is verified. That is, whether the instruction information meets the device-side prohibition condition is verified. For example, even in the case where the terminal-side prohibition check process is performed by the terminal apparatus 10, the instruction information meets the device-side prohibition condition in some cases if the version of the terminal-side prohibition condition is old. In addition, in the case no certificate information is received by the image forming apparatus 12, it is unclear if the prohibition check process has been performed by the terminal apparatus 10 or the prohibition check process has not been performed. In these cases, a situation is prevented where processing based on such instruction information is performed without any check in accordance with the exemplary embodiment.

In the case where the terminal-side prohibition condition does not match the device-side prohibition condition, the device-side prohibition check process is performed by the image forming apparatus 12, and execution of processing based on the instruction information is permitted or prohibited depending on a result of the device-side prohibition check process. In this way, execution of processing based on the instruction information not subjected to the prohibition check process is prevented.

In the case where it is determined as a result of the device-side prohibition check process that the instruction information denotes settings (processing content) not supported by the image forming apparatus 12, the execution control unit 48 may perform control so that processing supported by the image forming apparatus 12 to be partially performed among the processing group denoted by the instruction information. In this case, information indicating that part of the processing group included in the instruction information is to be performed is transmitted from the image forming apparatus 12 to the terminal apparatus 10 and is displayed on the display unit 20 of the terminal apparatus 10. The part of the processing group may be performed if the user inputs an instruction to perform it or may be automatically performed.

In accordance with the exemplary embodiment, in the case where the certificate information is invalid, a problematic condition is identified from the terminal-side prohibition condition and the device-side prohibition condition. If the terminal-side prohibition condition is problematic, such a problem is resolved if the terminal-side prohibition condition is updated. If the device-side prohibition condition is problematic, such a problem is resolved if the device-side prohibition condition is updated.

The control unit 42 of the image forming apparatus 12 may manage, for each terminal apparatus 10, a certificate information reception log and may reject instruction information from the terminal apparatus 10 that has not transmitted certificate information in the past. Specifically, it is considered that such a terminal apparatus 10 does not have a function of performing a prohibition check process or a function of creating certificate information, and accordingly, the reliability of the terminal apparatus 10 is low. Thus, prohibiting acceptance of the instruction information from such a terminal apparatus 10 in advance prevents execution of processing not supported by the image forming apparatus 12.

Even in the case where the certificate information is valid, if another item to be prioritized is set, processing may be performed in accordance with the prioritized item. For example, in the case where the image forming apparatus 12 has a security setting, processing based on instruction information may be omitted if the instruction information does not meet the security condition even if the corresponding certificate information is valid.

Modifications

Figure 5:
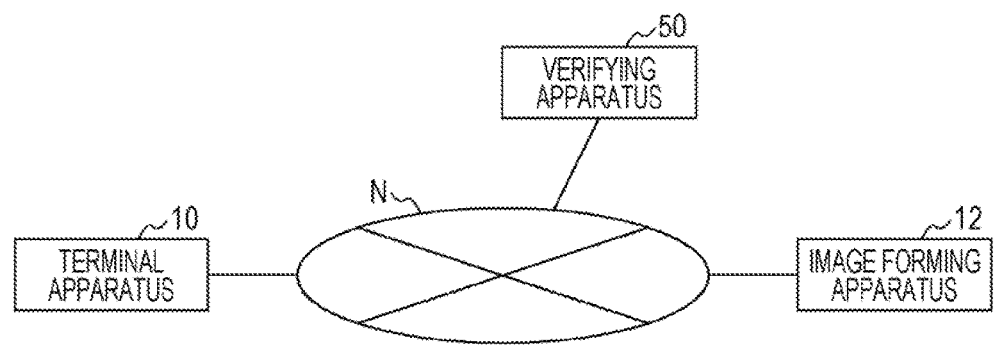
FIG. 5 is a block diagram illustrating an image forming system according to a modification.

An image forming system according to modifications will be described next. FIG. 5 illustrates an example of an image forming system according to a modification. The image forming system according to the modification includes the terminal apparatus 10, the image forming apparatus 12, and a verifying apparatus 50 which are connected to the communication channel N.

In the above-described exemplary embodiment, the terminal-side prohibition check process and the certificate information creation process are performed by the terminal apparatus 10, and the certification information verification process is performed by the image forming apparatus 12. In the modification, the terminal-side prohibition check process and the certificate information creation process are performed by the verifying apparatus 50. Alternatively, the terminal-side prohibition check process may be performed by the terminal apparatus 10, and the certificate information creation process may be performed by the verifying apparatus 50. Alternatively, the certificate information verification process may be performed by the verifying apparatus 50. The modifications will be described in detail below.

For example, the verifying apparatus 50 includes the prohibited instruction checking unit 30 and the certificate creating unit 32. The verifying apparatus 50 stores the above-described terminal-side prohibition condition information. The verifying apparatus 50 also has a function of exchanging data with another apparatus. In this case, the terminal apparatus 10 creates instruction information without performing the terminal-side prohibition check process. The instruction information is transmitted from the terminal apparatus 10 to the verifying apparatus 50. The prohibited instruction checking unit 30 of the verifying apparatus 50 performs the terminal-side prohibition check process in accordance with the terminal-side prohibition condition. If the instruction information denotes processing that meets the terminal-side prohibition condition, an error message or a message prompting the user to change the setting is transmitted from the verifying apparatus 50 to the terminal apparatus 10. If the instruction information denotes no processing that meets the terminal-side prohibition condition, the certificate creating unit 32 creates certificate information. The instruction information and the certificate information are transmitted from the verifying apparatus 50 to the image forming apparatus 12. As in the exemplary embodiment, the image forming apparatus 12 performs the certificate information verification process and then performs processing in accordance with the verification result. If the certificate information is valid, the image forming apparatus 12 performs processing in accordance with the instruction information. If the certificate information is invalid, information such as an error message is transmitted from the image forming apparatus 12 to the terminal apparatus 10.

In another example, the verifying apparatus 50 may include the certificate creating unit 32 alone. In this case, the terminal apparatus 10 creates the instruction information and performs the terminal-side prohibition check process. The instruction information subjected to the terminal-side prohibition check process is transmitted from the terminal apparatus 10 to the verifying apparatus 50. Then, the certificate creating unit 32 of the verifying apparatus 50 creates certificate information. The instruction information and the certificate information are transmitted from the verifying apparatus 50 to the image forming apparatus 12. The image forming apparatus 12 performs the certificate information verification process and performs processing in accordance with the verification result as in the above-described exemplary embodiment.

In another example, the verifying apparatus 50 may include the verifying unit 44. The verifying apparatus 50 stores the device-side prohibition condition information. In this case, the terminal apparatus 10 creates the instruction information, performs the device-side prohibition check process, and creates the certificate information. The instruction information subjected to the terminal-side prohibition check process and the certificate information are transmitted from the terminal apparatus 10 to the verifying apparatus 50. The verifying unit 44 of the verifying apparatus 50 verifies whether the certificate information is valid. If the certificate information is valid, the instruction information is transmitted to the image forming apparatus 12, and the image forming apparatus 12 performs processing according to the instruction information. If the certificate information is invalid, information indicating so and the instruction information are transmitted from the verifying apparatus 50 to the image forming apparatus 12. The image forming apparatus 12 performs the device-side prohibition check process on the instruction information and performs processing according to the result of the device-side prohibition check process. If the instruction information denotes no processing that meets the device-side prohibition condition, the image forming apparatus 12 performs processing according to the instruction information. If the instruction information denotes processing that meets the device-side prohibition condition, information such as an error message is transmitted from the image forming apparatus 12 to the terminal apparatus 10. In another example, the verifying apparatus 50 may include the verifying unit 44 and the prohibited instruction checking unit 46. In this case, the verifying apparatus 50 performs the device-side prohibition check process. If the instruction information denotes no processing that meets the device-side prohibition condition, the instruction information is transmitted from the verifying apparatus 50 to the image forming apparatus 12. The image forming apparatus 12 performs processing according to the instruction information. If the instruction information denotes processing that meets the device-side prohibition condition, information such as an error message is transmitted from the verifying apparatus 50 to the terminal apparatus 10.

In accordance with the modifications, whether the prohibition check process has been performed in accordance with the terminal-side prohibition condition that matches the device-side prohibition condition is verified as in the above-described exemplary embodiment.

Note that, for example, the control unit 42 of the image forming apparatus 12 according to the exemplary embodiment and the modifications may create log information about requested processing. This log information is stored in, for example, the storage unit 38. The log information includes, for example, information indicating an apparatus that has created certificate information, information indicating an apparatus (the terminal apparatus 10, the image forming apparatus 12, or both the terminal apparatus 10 and the image forming apparatus 12) that has performed that prohibition check process, information indicating that the certificate information is invalid, information indicating the terminal apparatus 10 that has issued a request for the processing, and information denoting date/time at which the processing request has been issued and date/time at which the processing has been performed. Obviously, information other than the above ones may be included in the log information or at least one of the above ones may be included in the log information. The log information may be stored in association with document data to be processed. If the terminal-side prohibition condition is updated in the terminal apparatus 10, information indicating so may be included in the log information. In addition, only log information that meets a specific condition may be stored among plural pieces of log information. For example, log information indicating that the certificate information is invalid and log information indicating that a prohibition check process is performed in the image forming apparatus 12 may be stored, and log information for other events may not be created or may be deleted. Obviously, this condition is an example, and log information may be stored in accordance with other conditions. In addition, in the case where the total amount of data of the log information becomes greater than or equal to a threshold, the log information may be transmitted to a storage device provided by a cloud service and may be stored therein. In addition, in the case where an elapsed time since creation of the log information becomes equal to or greater than a threshold, the log information may be deleted or may be transmitted to and stored in another storage device.

In the exemplary embodiment and modifications described above, it is determined whether the terminal-side prohibition condition (terminal-side prohibition logic) matches the device-side prohibition condition. In another example, in the case where applications (programs) having a function in common are installed on the terminal apparatus 10 and the image forming apparatus 12, it may be determined whether these applications match each other. For example, suppose that a terminal-side application is installed on the terminal apparatus 10 and a device-side application is installed on the image forming apparatus 12. Suppose that these applications have a function in common. For example, in the case where the version of the terminal-side application is older than the version of the device-side application, the update of the terminal-side application may be transmitted from an apparatus such as a server to the terminal apparatus 10 and may be installed on the terminal apparatus 10.

The terminal apparatus 10 and the image forming apparatus 12 are each implemented as a result of cooperation of hardware resources and software, for example. Specifically, the terminal apparatus 10 and the image forming apparatus 12 each include a processor such as a central processing unit (CPU). The processor loads and executes a program stored in a storage device (not illustrated), whereby the functions of the respective units of the terminal apparatus 10 and the image forming apparatus 12 are implemented. The program is stored in the storage device via a recording medium, such as a Compact Disc (CD) or a Digital Versatile Disc (DVD), or via a communication channel, such as a network. Alternatively, the individual units of the terminal apparatus 10 and the image forming apparatus 12 may be implemented by hardware resources, for example, a processor and an electronic circuit. To implement the individual units, a device such as a memory may be used. In another example, the individual units of the terminal apparatus 10 and the image forming apparatus 12 may be implemented by a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be denoted by the following claims and their equivalents.

What is claimed is:

1. An information processing system comprising:
a terminal apparatus; and
an information processing apparatus,
the terminal apparatus including
a processor programmed to
accept one or more settings relating to processing and create instruction information denoting the one or more settings, and
transmit the instruction information to the information processing apparatus, and
the information processing apparatus including
a processor programmed to
perform the processing related to the one or more settings denoted by the instruction information,
receive the instruction information and certificate information, the certificate information including a certification of content of a first prohibition check process determining whether the information processing apparatus supports the one or more settings, and
perform control so that the processing is performed depending on validity of the certificate information.

2. The information processing system according to claim 1, wherein the first prohibition check process is performed in response to acceptance of each of the one or more settings.

3. The information processing system according to claim 1, wherein the first prohibition check process is performed on the instruction information created based on the one or more settings that have been confirmed.

4. The information processing system according to claim 1, wherein the processor of the information processing apparatus is further programmed to
perform a second prohibition check process in a case where the certificate information is invalid or the certificate information is not received, the second prohibition check process being a process determining whether the information processing apparatus supports the one or more settings in accordance with a second prohibition condition, the second prohibition condition being a condition that denotes processing uniquely prohibited in the information processing apparatus, and
the processor of the information processing apparatus permits the information processing apparatus to perform or prohibits the information processing apparatus from performing the processing related to the one or more settings in accordance with a determination result of the second prohibition check process.

5. The information processing system according to claim 4, wherein in a case where the second prohibition condition matches a first prohibition condition used in the first prohibition check process, it is determined in the second prohibition check process that the certificate information is valid.

6. The information processing system according to claim 4, wherein the terminal apparatus outputs warning information depending on validity of the second prohibition condition.

7. The information processing system according to claim 1, wherein the processor of the terminal apparatus is further programmed to
perform the first prohibition check process in accordance with a first prohibition condition,
create the certificate information, and
the transmit the instruction information and the certificate information to the information processing apparatus.

8. The information processing system according to claim 7, wherein the processor of the information processing apparatus is further programmed to
transmit information prompting updating of the first prohibition condition to the terminal apparatus in a case where the certificate information is invalid.

9. The information processing system according to claim 1, further comprising
an external apparatus different from the terminal apparatus and the information processing apparatus, wherein the external apparatus performs the first prohibition check process and creates the certificate information.

10. The information processing system according to claim 1, wherein in a case where the information processing apparatus supports part of the processing related to the one or more settings, the processor of the information processing apparatus permits the information processing apparatus to perform the part of the processing.

11. An information processing apparatus comprising:
a first processor; and
a second processor,
wherein the first processor is programmed to
accept one or more settings relating to processing and create instruction information denoting the one or more settings, and
output the instruction information to the second processor, and
the second processor is programmed to
perform the processing related to the one or more settings denoted by the instruction information,
obtain the instruction information and certificate information, the certificate information including a certification of content of a first prohibition check process determining whether the information processing apparatus supports the one or more settings, and
perform control so that the processing is performed depending on validity of the certificate information.

12. The information processing apparatus according to claim 11, wherein the second processor is further programmed to
perform a second prohibition check process in a case where the certificate information is invalid or the certificate information is not obtained, the second prohibition check process being a process determining whether the information processing apparatus supports the one or more settings in accordance with a second prohibition condition, and wherein
the second processor permits the information processing apparatus to perform or prohibits the information processing apparatus from performing the processing related to the one or more settings in accordance with a determination result of the second prohibition check process.

13. The information processing apparatus according to claim 12, wherein the first processor is further programmed to
perform the first prohibition check process in accordance with a first prohibition condition, and
the certificate information is determined to be valid in a case where the first prohibition condition matches the second prohibition condition.

14. A non-transitory computer readable medium storing a program causing a computer to execute a process for information processing, the process comprising:

accepting one or more settings related to processing and creating instruction information denoting the one or more settings;

performing control to transmit the instruction information to an information processing apparatus that performs the processing related to the one or more settings denoted by the instruction information;

obtaining certificate information including a certification of content of a prohibition check process determining whether the information processing apparatus supports the one or more settings; and performing control so that the processing is performed by the information processing apparatus depending on validity of the certificate information.

* * * * *